FIP8102 XR 3,245,005
CROSS REFERENCE
SEARCH ROOM
1x5274D

April 5, 1966 W. L. GARFIELD 3,245,005

FREQUENCY MODULATED TRANSMITTER MONITOR

Filed Aug. 27, 1963

Inventor
WILLIAM L. GARFIELD
By [signature]
Attorney

3245005
OR IN 332/20

3,245,005

FREQUENCY MODULATED TRANSMITTER MONITOR

William Littery Garfield, London, England, assignor to International Standard Electric Corporation, New York, N.Y., a corporation of Delaware Filed Aug. 27, 1963, Ser. No. 304,816
Claims priority, application Great Britain, Oct. 4, 1962, 37,526/62
8 Claims. (Cl. 332—20)

This invention relates to monitors for checking the swept band of a frequency modulated electrical signal. The term "swept band" as used in this specification refers to the difference between the maximum and minimum frequencies of a frequency modulated signal during each cycle of a modulating signal of substantially fixed amplitude.

According to the invention there is provided a frequency modulated electrical signal monitor including an amplitude modulator and a modulating signal source, the amplitude modulator having input terminals coupled to the modulating signal source and input terminals adapted for coupling to a frequency modulated electrical signal source, means to control the frequency of the said modulating signal source to a particular value, an arrangement having an adjustable electrical frequency response coupled to the output terminals of the amplitude modulator, and an amplitude detector coupled to the arrangement having the adjustable electrical frequency response.

An embodiment of the invention as used in a radio altimeter will now be described with reference to the accompanying drawings in which.

Figure 1:
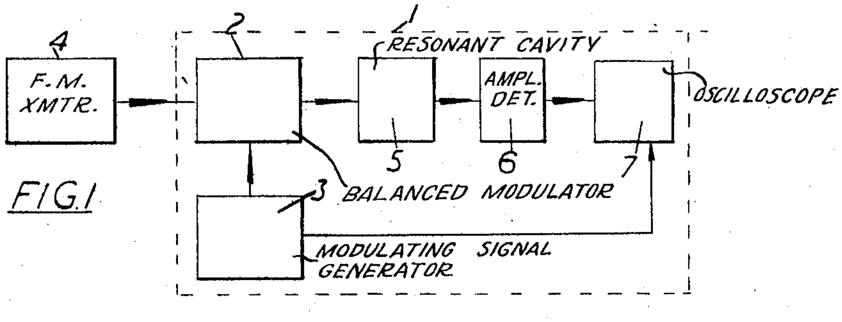
FIG. 1 is a block schematic diagram of a monitor used to monitor the swept band of a frequency modulated transmitter.

FIG. 1 shows a monitor indicated by the dotted line 1 which includes a balanced modulator 2 having one pair of input terminals connected to a modulating signal generator 3 and another pair of input terminals connected to an external frequency modulated transmitter 4. The output terminals of the balanced modulator 2 are coupled to a resonant cavity 5 the tuning of which is adjustable. The resonant cavity is also coupled to an amplitude detector circuit 6, and a cathode ray oscilloscope 7 is coupled to the output terminals of the amplitude detector circuit.

The frequency modulated transmitter 4 is the transmitter of the radio altimeter equipment and generates a carrier frequency of approximately 4300 mc./s. which is frequency modulated by a 300 c./s. modulating signal the swept band being either 100 mc./s. or 10 mc./s. depending upon the required height range.

The frequency modulating signal is obtained from a 300 c./s. oscillator in the transmitter 4, and is quite distinct from the amplitude modulating signal obtained from the signal generator 3. The absolute value of the centre frequency of the frequency modulated signal is of secondary importance, but it is important to know the swept band accurately as this determines the performance of the radio altimeter equipment.

The frequency modulated signal output from the transmitter 4 is fed over a co-axial feeder to the carrier signal input terminals of the balanced modulator 2. The modulating signal generator 3 includes two stable oscillators, one at a nominal frequency of 100 mc./s. and the the other at a nominal frequency of 10 mc./s. The frequencies of both oscillators are variable over a range of a few percent of the nominal frequency. The signal output from either oscillator can be switched to the modulating signal input terminals of the balanced modulator 2.

The balanced modulator incorporates a stripline hybrid ring junction. The transmitter signal is fed into one branch of the junction where it is divided equally between two mixer semiconductor diodes located in two further branches of the junction. The modulating signal is fed to each of the mixer diodes 180 degrees out of phase, and the sideband signals produced by the amplitude modulation are extracted from a fourth branch of the junction. The dimensions of the stripline ring are such that the carrier signal components tend to cancel at the fourth or output branch of the junction. The degree of balance is controlled by varying the D.C. load resistance of one of the mixer diodes.

The signal output from the balanced modulator 2 is fed by means of a co-axial feeder to the resonant cavity 5, the tuning of which is adjustable. The amplitude detector circuit 6 includes a semiconductor diode which is coupled to the resonant cavity 5 and a uni-directional output voltage is obtained from the output the level of which depends upon the amplitude of the signal wave in the resonant cavity. The level of the output voltage from the detector circuit 6 varies periodically owing to the frequency modulation of the signal and the variations in the output voltage are observed by feeding it to the vertical deflection plates of a cathode-ray oscilloscope.

To monitor the swept band of the transmitter 4 the modulating signal generator 3 is first switched off and the tuning of the resonant cavity 5 is adjusted until a train of single pulses is displayed on the cathode ray oscilloscope 7. The degree of balance in the balanced modulator is adjusted until the pulses displayed on the oscilloscope screen have a convenient level. In order to illustrate the operation of the monitor it will be assumed that the required swept band is nominally 10 mc./s. but the operation is exactly the same when the nominal swept band is 100 mc./s.

Figure 2:
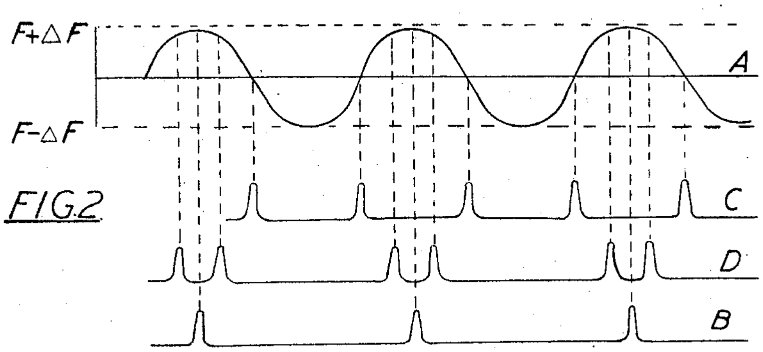
FIG. 2 shows certain relationships illustrating the principle of operation of the invention graphically.

FIG. 2A shows that the frequency of the transmitter signal varies sinusoidally with time between the maximum and minimum values, $F+\Delta F$ and $F-\Delta F$ respectively, where F is the centre frequency of the transmitter signal and $2\Delta F$ is the swept band of the signal. It will be assumed that $\pm\Delta F$ is exactly equal to $\pm 5$ mc./s. and the resonant cavity 5 is tuned to $F+5$ mc./s. A single pulse will then occur on the oscilloscope during each cycle of the modulating signal as shown in FIG. 2B. If the resonant cavity were tuned to F two equally spaced responses would then occur for each cycle of the modulating signal as shown in FIG. 2C, and if the resonant cavity were tuned to any frequency in the swept band other than F, $F+5$ mc./s. or $F-5$ mc./s. two unequally spaced pulses would be obtained during each cycle of the modulating signal, as shown in FIG. 2D. The resonant cavity 5 could equally well have been tuned to $F-5$ mc./s., but it will be assumed for the present that it has been tuned to $F+5$ mc./s.

Figure 3:
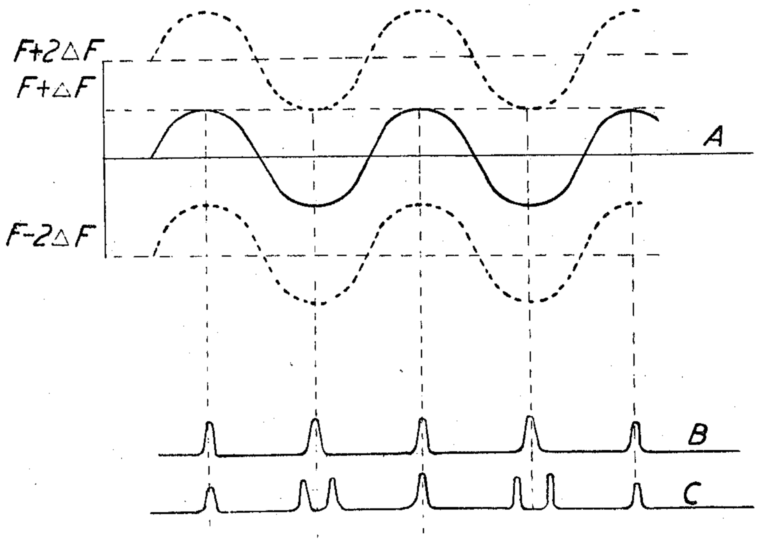
FIG. 3 shows further relationships illustrating the principle of operation of the invention graphically.

The 10 mc./s. oscillator is then switched on and its frequency is adjusted until a single additional pulse is obtained during each cycle of the modulating signal. The additional pulse is situated mid-way between the two responses. The 10 mc./s. oscillator modulates the amplitude of the frequency modulated signal from the transmitter and therefore upper and lower sidebands spaced by 10 mc./s. from the frequency modulated transmitter signal are present in the output signal from the balanced modulator. FIG. 3A shows that the sidebands are frequency modulated by exactly the same amount as the carrier or unmodulated transmitter signal. The pulses displayed on the oscilloscope are shown in FIG. 3B. If the frequency of the amplitude modulating signal from the generator 3 is too high, the additional pulses will be duplicated as shown in FIG. 3C. If the frequency of the amplitude modulating signal is too low then no additional responses will be obtained and the display obtained will be as shown in FIG. 2B. When the frequency of the amplitude modulating signal has the value appropriate to the swept band the duplicate additional pulses and the additional pulses coalesce. The frequency of the modulating signal generator 3 is adjusted by varying a parameter of the 10 mc./s. oscillator circuit.

When the correct display is obtained the frequency of the modulating signal generator 3 is read off from a calibrated scale. In this particular instance this frequency is exactly 10 mc./s., since the swept band is exactly 10 mc./s.

Exactly the same procedure would have been followed if the swept band had not been exactly 10 mc./s., or had been in the 100 mc./s. range, except that in the latter case the 100 mc./s. oscillator of the modulating signal generator 3 would have been used.

The procedure described above enables the swept band of the transmitter signal to be determined. The same monitor can be used to adjust the swept band to a particular value. When it is required to do this, the resonant cavity 5 is tuned to either the maximum or the minimum value of the frequency modulated signal with the amplitude modulating signal switched off, as is the procedure described above. The modulating signal generator 3 is then switched on and the frequency of either the 10 mc./s. or the 100 mc./s. oscillator, as required, is set to a value corresponding to the swept band.

The display on the oscilloscope is observed and if it is not as shown in FIG. 3B the following procedure must be carried out. The frequency excursion of the transmitter signal is adjusted by varying the amplitude of the 300 c./s. frequency modulating signal in the transmitter. The modulating signal generator 3 is then switched off and the resonant cavity is re-tuned to either the maximum or minimum value of the frequency modulated signal, the signal generator 3 is switched on again and the display on the oscilloscope is observed. The procedure is repeated until the correct display is obtained.

If the monitor is to be used only to set up the swept band of the transmitter, the modulating signal generator 3 can comprise two fixed frequency oscillators, the frequency of which is controlled by, for example, a quartz crystal.

It has been assumed that the resonant cavity 5 is tuned to the maximum frequency of the transmitter carrier signal, under this condition the additional pulses are obtained at the instants when the upper sideband frequency is at the minimum value. The resonant cavity 5 could equally well be tuned initially to the minimum value of the transmitter carrier. When the amplitude modulating signal is switched on, the additional pulses would be obtained at the instants when the lower sideband frequency is at its maximum value.

An important feature of the embodiment of the invention described is that the accuracy to which the swept band can be set or to which its value can be determined is dependent only upon the Q-factor of the wavemeter and the accuracy of the 10 and 100 mc./s. oscillator. The swept band is required to be accurate to within ±100 kc./s. in 10 mc./s., and ±1 mc./s. in 100 mc./s. These requirements are readily met in the embodiment of the invention. In a previous method of monitoring the swept band of the same altimeter transmitter signal, the accuracy of the measurement depended upon producing, maintaining and reading a tuning calibration of the resonant cavity to an accuracy better than ±100 kc./s. in 4300 mc./s., which was found to be difficult, expensive and time-consuming.

It is convenient to modulate the amplitude of the transmitter in a balanced modulator having an adjustable balance control in order that the level of the pulses produced on the oscilloscope by both the carrier and the sideband signals can be made roughly the same. A simple amplitude modulator could be used in place of a balanced modulator, although the discrepancy between the levels of the carrier and sideband pulses would then be considerable.

Instead of adjusting the resonant cavity 5 to either the maximum or the minimum value of the transmitter signal frequency, another procedure may be used in which the resonant cavity is adjusted to either the minimum frequency of the upper sideband or the maximum frequency of the lower sideband produced by amplitude modulating the frequency modulated signal. If an amplitude modulating signal is used which has a frequency equal to one-half the required swept band, four equally spaced single responses are obtained during each cycle of the frequency modulating signal. By adjusting the balance control (of the amplitude modulator) so as to balance out completely the carrier signal two equally spaced single responses can be obtained during each cycle of the frequency modulating signal.

Although in the embodiment of the invention previously described the amplitude modulator incorporates a wave guide construction, at lower frequencies lumped circuit components may be used, and the resonant cavity 5 could be replaced by a tuned filter incorporating lumped inductance and capacitance components. The pulses produced at the output of the amplitude detector 6 could be detected by means other than display on an oscilloscope. A pulse counter could, for example, be used to count the number of pulses from the output of the amplitude occurring during each cycle of the frequency modulating signal.

In the particular embodiment of the invention described, the monitor is used to check the swept band of the output signal from a radio altimeter transmitter. The invention can equally well be applied to monitors for checking the swept band of signals in other systems in which frequency modulated signals having a fixed swept band are used, such as in certain other frequency modulated radar systems.

What I claim is:

1. A frequency modulated electrical signal monitor including an amplitude modulator, a modulating signal source, said amplitude modulator having input terminals coupled to said modulating signal source and input terminals adapted for coupling to a frequency modulated electrical signal source, means to adjust the frequency of said modulating signal source to a particular value, an arrangement having an adjustable electrical frequency response coupled to the output terminals of said amplitude modulator which arrangement has a narrow bandpass and high Q characteristic, an amplitude detector coupled to said arrangement having the adjustable frequency response, and means coupled to said amplitude detector for exhibiting a display of detected amplitude versus time.

2. A frequency modulated signal monitor as in claim 1 wherein said control means can be adjusted so that the frequency of said modulating signal source is set to a value numerically equal to a frequency band over which the frequency modulated signal source is swept.

3. A frequency modulated signal monitor as in claim 2 wherein said amplitude modulator includes an arrangement to balance out the carrier component at the output terminals of the said modulator.

4. A frequency modulated signal monitor as in claim 3 wherein said arrangement having the adjustable frequency response is a resonant cavity.

5. Apparatus for determining the limits of the frequency band swept out by a frequency modulated transmitted signal, comprising: an amplitude modulator having first and second inputs, a modulating signal generator coupled to the first input of said amplitude modulator, the second input of said amplitude modulator being coupled to the frequency modulated transmitted signal, a frequency sensitive device having a narrow bandpass and high Q characteristic coupled to the output of said amplitude modulator, an amplitude detector coupled to said frequency sensitive device and means coupled to said amplitude detector for exhibiting a display of detected amplitude versus time.

6. Apparatus for determining the limits of the frequency band swept out by a frequency modulated signal, comprising: a balanced modulator having first and second inputs, a modulating signal generator coupled to the first input to said balanced modulator, the second input of said balanced modulator being coupled to the frequency modulated transmitted signal, a resonant cavity having a narrow bandpass and high Q characteristic coupled to the output of said balanced modulator, an amplitude detector coupled to said resonant cavity and means coupled to said amplitude detector for exhibiting a display of detected amplitude versus time.

7. Apparatus for determining the limits of the frequency band swept out by a frequency modulated transmitted signal as in claim 6 wherein said resonant cavity is tuned to one limit of said swept band.

8. Apparatus for determining the limits of the frequency band swept out by a frequency modulated transmitted signal as in claim 7 wherein said modulating signal generator is adjusted to emit a frequency equal to the numerical value of the band swept by the frequency modulated transmitted signal.

References Cited by the Examiner

UNITED STATES PATENTS 2,276,672 3/1942 Roberts ------------- 332—20
2,309,481 1/1943 Summerhayes ---- 329—111 X HERMAN KARL SAALBACH, *Primary Examiner.*

ROY LAKE, *Examiner.*

P. L. GENSLER, *Assistant Examiner.*